(12) United States Patent
Wootton et al.

(10) Patent No.: US 7,505,972 B1
(45) Date of Patent: Mar. 17, 2009

(54) METHOD AND SYSTEM FOR DYNAMIC ASSIGNMENT OF ENTITLEMENTS

(75) Inventors: Jay Wootton, Lindon, UT (US); Dennis Foster, Spanish Fork, UT (US); Joe Skehan, Sandy, UT (US); Charles Morgan, Springville, UT (US); Jason Elsberry, Provo, UT (US); Ryan L. Cox, Provo, UT (US); William Street, Orem, UT (US); Stephen R Carter, Spanish Fork, UT (US); Nick Nikols, Draper, UT (US)

(73) Assignee: Novell, Inc., Provo, UT (US)

( * ) Notice: Subject to any disclaimer, the term of this patent is extended or adjusted under 35 U.S.C. 154(b) by 680 days.

(21) Appl. No.: 10/795,682

(22) Filed: Mar. 8, 2004

(51) Int. Cl.
*G06F 7/00* (2006.01)
(52) U.S. Cl. .................. 707/9; 707/3; 707/102
(58) Field of Classification Search .............. 707/1, 707/3, 4, 5, 6, 9, 100, 101, 102, 200; 340/5.74; 726/4
See application file for complete search history.

(56) References Cited

U.S. PATENT DOCUMENTS

| | | | | |
|---|---|---|---|---|
| 6,366,913 | B1 * | 4/2002 | Fitler et al. ................. | 707/9 |
| 6,768,988 | B2 * | 7/2004 | Boreham et al. .............. | 707/3 |
| 7,031,922 | B1 * | 4/2006 | Kalinowski et al. ......... | 704/271 |
| 7,263,516 | B2 * | 8/2007 | Graylin et al. ............... | 707/3 |
| 2002/0152212 | A1 * | 10/2002 | Feldman ...................... | 707/9 |
| 2002/0188869 | A1 * | 12/2002 | Patrick ....................... | 713/201 |
| 2003/0084069 | A1 * | 5/2003 | Boreham et al. ............ | 707/200 |
| 2003/0115322 | A1 | 6/2003 | Moriconi et al. | |
| 2005/0004913 | A1 * | 1/2005 | Gross et al. .................. | 707/9 |
| 2005/0015471 | A1 * | 1/2005 | Zhang et al. ................ | 709/221 |
| 2005/0015621 | A1 * | 1/2005 | Ashley et al. ............... | 713/201 |
| 2005/0138061 | A1 * | 6/2005 | Kuehr-McLaren et al. .. | 707/102 |

* cited by examiner

*Primary Examiner*—Greta L Robinson
(74) *Attorney, Agent, or Firm*—Haynes and Boone, LLP (57) ABSTRACT

A method and system for dynamic assignment of entitlements is provided. A trigger is received from an identity store. A membership generator generates a list of members from user objects stored in the identity store. The generated list is compared against a previously generated list for changes. The changes are placed into an attribute modify specification, an entitlement grant specification, and an entitlement revoked specification. Using these specifications, a policy decision module routes the changes to policy enforcement modules. The policy enforcement modules implement the changes to entitlements.

15 Claims, 6 Drawing Sheets

METHOD AND SYSTEM FOR DYNAMIC ASSIGNMENT OF ENTITLEMENTS

FIELD OF THE INVENTION

The present invention relates generally to computer software, and more particularly, to a method and system for dynamic assignment of entitlements.

SUMMARY

Provided is a unique system and method for dynamic assignment of entitlements. In one embodiment a first membership list from a plurality of user objects is generated, and a trigger indicating a change in one of the plurality of user objects is received. A second membership list from the plurality of user objects is generated, and the first membership list is compared against the second membership list. A specification that indicates the change is generated, and the access to an entitlement is modified in accordance with the specification.

In a second embodiment, a computer-readable medium comprising a plurality of instructions for execution by at least one computer processor, has instructions for generating a first membership list from a plurality of user objects, and receiving a trigger indicating a change in one of the plurality of user objects of an entitlement selection corresponding to an entitlement. The instructions also generate a second membership list from the plurality of user objects and compare the first membership list and the second membership list. The instructions continue on to generate an attribute modify specification in accordance with the change, generate an entitlement grant specification in accordance with the change, and generate an entitlement revoke specification in accordance with the change. The instructions also modify access to the entitlement.

In another embodiment, a system for managing entitlements is shown. The system comprises a membership generator in communication with an identity store, a first membership list generated by the membership generator, a second membership list generated by the membership generator, a change calculator that compares the first membership list and the second membership and that outputs a specification containing rules in accordance with the comparison, and a policy enforcement module for implementing at least one rule in the specification.

DETAILED DESCRIPTION

This disclosure relates generally to computer software and, more specifically, to a system and method for dynamic assignment of entitlements. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
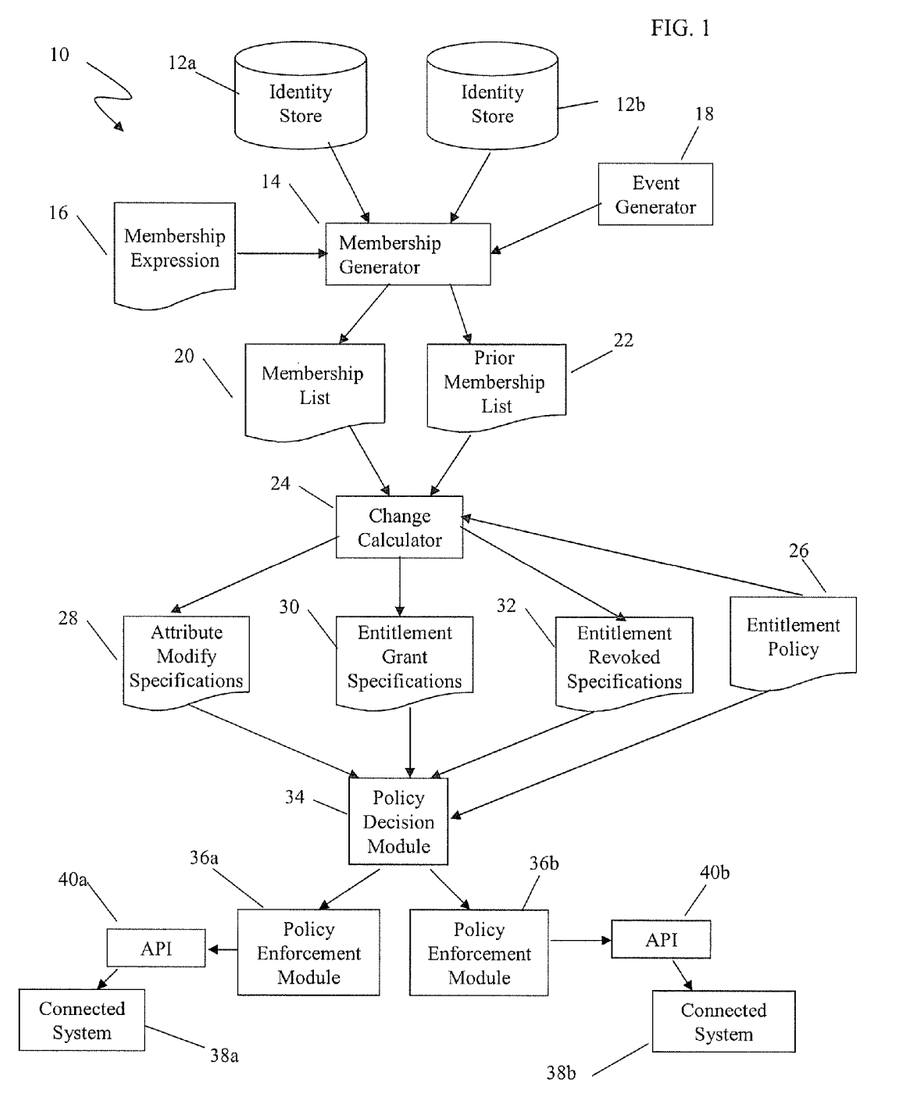
FIG. 1 is a diagram of an example embodiment of the present invention.

Referring now to FIG. 1, a system 10 for dynamic assignment of entitlements is shown according to one example of the present invention. A series of identity stores 12a, 12b communicate with a membership generator 14. The membership generator 14 is also in communication with a membership expression 16 and an event generator 18.

The identity stores 12a, 12b may be any form of system, database, any component of the database such as a database directory, or application. Each identity store may have a specific schema. A schema is metadata that describes the contents of the identity store, the relationships between elements in the identity store, and the rights and permissions management provided by the store. In one embodiment the identity stores may be an access control list (ACL), which is a list of the services available in a particular system, database, or application, and a list of the computers and users permitted to use the services. For example, one identity store may allow rights and permissions at the attribute level, while a second identity store may provide for rights and permissions at the file level, and a third may provide for rights and permissions at the record or object level. In another embodiment, the identity stores 12a, 12b may contain user objects that contain entitlement selections corresponding to entitlements. Example types of entitlements include access to buildings or particular portions of buildings, access to software, servers, data, or directories, attributes indicative of the type of access to software, servers, data, or directories (e.g. Read or Read/Write), and eligibility for corporate benefits.

The membership generator 14 is capable of generating a membership list 20 and a prior membership list 22 and may use membership expression 16. The membership expression 16 is a set of inclusion and exclusion criteria for membership lists. Some example criteria include LDAP filter statements, static membership statements, static inclusion/exclusion statements, dynamic inclusion/exclusion statements, and dynamic/static trustee right assignments, or any combination of the foregoing. In one embodiment, the membership generator 14 queries one of the identity stores 12a, 12b in accordance with membership expression 16, and retrieves a list of user objects that match the query. An example query might request all user objects that have access to the information technology department. That list of user objects becomes a membership list 20.

The membership generator 14 may also be capable of receiving triggers. Triggers are signals to the generator 14 that a membership list needs to be generated. In one embodiment, the trigger can occur when a change has occurred in one or more of the identity stores 12a, 12b, In another embodiment, the trigger can occur from an event generator 18. Event generator 18 can be any thing that is capable of creating an event (e.g. "generate a trigger at 8:00 a.m."), such as a software script, an administrator, a hardware and/or software system in communication with the generator 14, or any other object or person that can initiate a trigger.

The membership list 20 is a list of members that is generated by membership generator 14 in accordance with the membership expression 16. The prior membership list 22 is a list of members that was generated by a specific membership expression 20. In one embodiment, the prior membership list 22 is created by duplicating the membership list 20 when the membership list 20 is first generated. In another embodiment, the prior membership list 22 is created by storing the results of a membership list generation by setting certain specific attributes in the objects or schema in one of the identity stores 12a, 12b such that a specific membership list can be recreated.

A change calculator 24 is in communication with membership list 20, prior membership list 22, and entitlement policy 26. Change calculator 24 accesses the membership list 20 and the prior membership list 22. The change calculator 24 analyzes and compares membership list 20 against prior membership list 22 for any changes, additions, subtractions, or modifications of members, access rights for members, or both. Using the discrepancies between the list 20 and the prior list 22, the change calculator 24 communicates with the entitlement policy 26 to determine the changes in entitlements. The change calculator 24 outputs the attribute modify specifications 28, the entitlement grant specifications 30, and the entitlement revoked specifications 32. In addition, change calculator 24 may use the rules set forth in the entitlement policy 26. Entitlement policy 26 may contain a base set of rules that must be followed regardless of the user object information.

Each of the specifications 28, 30, 32 contain information that is necessary for a particular entitlement. For example, each (or any) could contain group identifiers for identifying groups in one or both of connected systems 38a, 38b. In an alternative embodiment, the specifications could include account information, such as the data needed to create an account (e.g. first name and last name). In one embodiment, the information contained in the attribute modify specifications 28 are those changes that need to be made to attributes stored in an identity store, the information contained in the entitlement grant specifications 30 are those changes that need to be made in a connected system 38 to grant access to a particular entitlement, and the information contained in the entitlement revoked specifications 32 are those changes that need to be made in a connected system 38 to remove access to a particular entitlement. Additionally, the specifications 28, 30, 32 could be combined into one or two specifications.

Policy decision module 34 communicates with the attribute modify specification 28, the entitlement grant specification 30, and the entitlement revoked specification 32. In addition, the policy decision module may communicate with the entitlement policy 26. The policy decision module 34 uses the specifications 28, 30, 32, along with the policy 26 to generate actions.

The actions are sent to the policy enforcement modules 36a, 36b. Each of the policy enforcement modules 36a, 36b communicates with a connected system 38a, 38b through an application programming interface (API) 40a, 40b. Other methods of communication could be used as well, such as a protocol or event bus. The policy enforcement modules 36a, 36b send commands to the connected system to reflect the changes in entitlement communicated from the policy decision module 34. Connected systems 38a, 38b could be any form of computing system, such as an operating system, an LDAP directory, a database, and an application or group of applications. In addition, connected systems 38a, 38b could be any form of apparatus, system, or device that requires or uses a level of access or security, including automated door access systems, highway toll systems, and corporate resources.

Additionally, while depicted as distinct modules or elements, the modules and elements described herein may be combined into a single module or other number of modules, and may further be implemented in hardware or software form, or a combination thereof.

Figure 2:
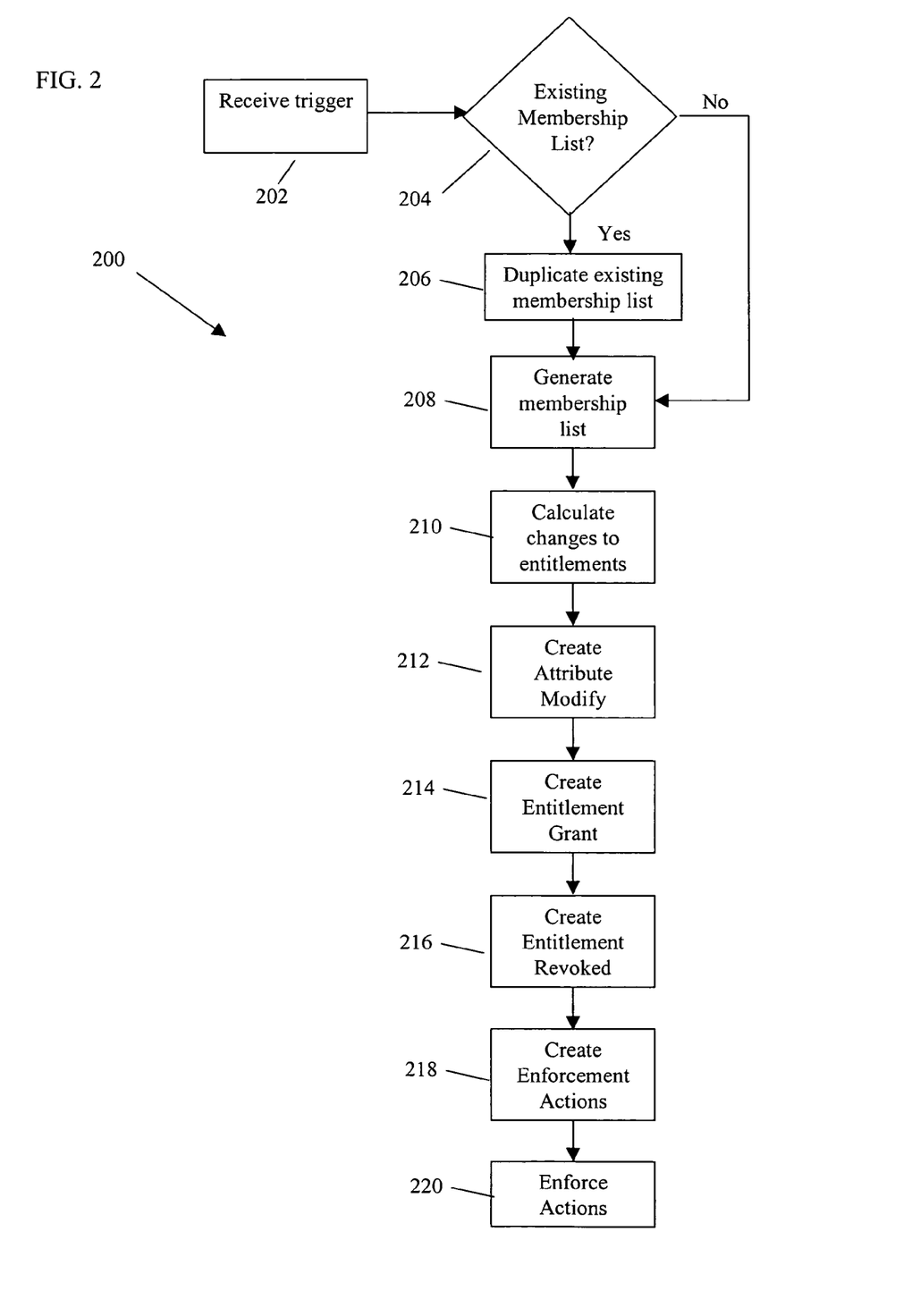
FIG. 2 is an illustration of the operational flow of an embodiment of the present invention.

Referring now to FIG. 2, an example 100 of the operation of an embodiment of the invention for managing global access rights in heterogeneous systems is shown. At step 202, a trigger will be received by a membership list generator. The trigger could be received from an identity store or from an external source. At step 204, the membership list generator determines whether a membership list for a particular virtual group exists. In one embodiment, a virtual group is a group of user objects that have a particular entitlement (or series of entitlements) in common. If the group exists, then that preexisting membership list is duplicated, step 206. If the group does not exist (or the existing membership list has been duplicated), the method proceeds to step 208, where the membership list is generated.

At step 210, the newly generated membership list is analyzed and compared against the duplicated prior membership list for any changes, additions, subtractions, or modifications of members, access rights for members, or both. If no prior membership list exists, the newly generated membership may be analyzed and compared against an empty membership list.

At step 212, the attribute modify specification is created. At step 214, the create entitlement specification is created. At step 216, the revoke entitlement specification is created.

At step 218, the attribute modify specification, the create entitlement specification, and the revoke entitlement specification may be passed to a policy decision module for the creation of enforcement actions. The enforcement actions are specific instructions or commands for a policy enforcement module. At step 220, the enforcement actions are enforced.

Figure 3:
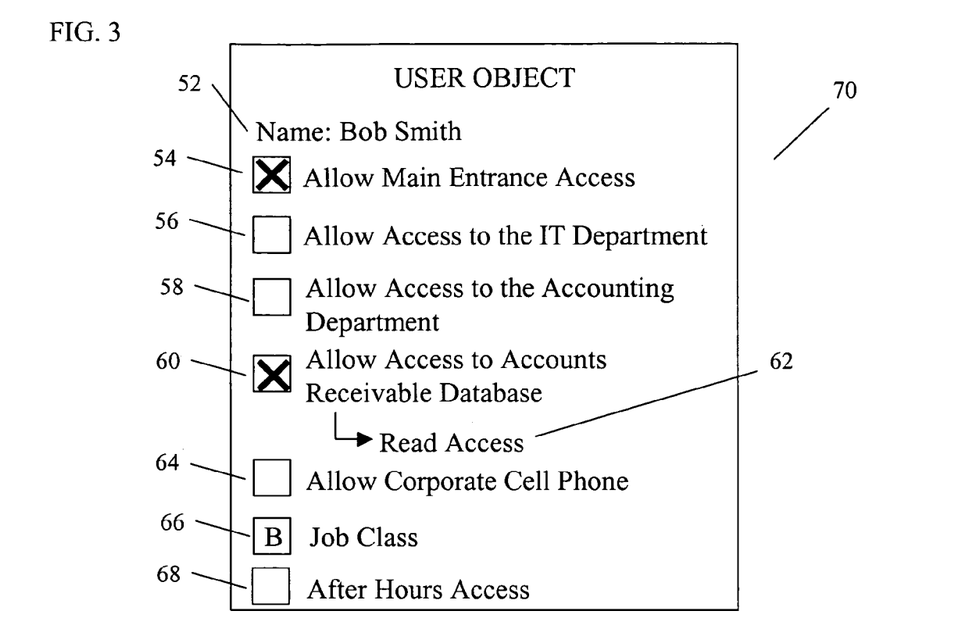
FIG. 3 is an example representation of a user object.

Referring now to FIG. 3, an example user object 50 for use in an embodiment of the present invention is shown. Object 50 is displayed using pseudo-code for example purposes. It is understood that the implementation of object 50 could be done using XML, java, text, or other object implementation methods. The user object may contain user information 52 and specific entitlement selections 54-68. Entitlement selections 52-68 can be of any variety for a particular facility. Each entitlement selection would correspond to the particular entitlement available. Those skilled in the art will understand that a wide variety entitlements and entitlement selections could be implemented in an object 50.

For this particular example, entitlement selection 54 is selected, indicating that the user is allowed access via the main entrance to the building. Entitlement selections 56, 58, 64, and 68 are not selected. Entitlement selection 60 is selected, thus indicating that this user is allowed access to the accounts receivable database in the accounting department. Attribute 62 indicates that the access that this user has to the accounts receivable database is only read access.

Figure 4:
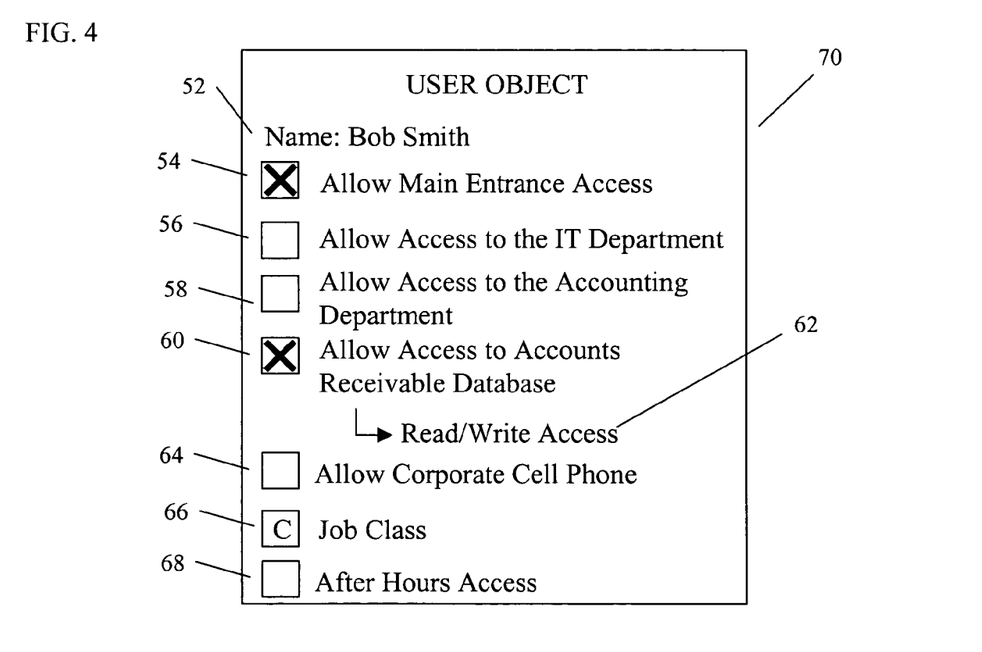
FIG. 4 is an example representation of a user object.

Referring now to FIG. 4, user object 70 is shown. User object 70 is a modified version of object 50. Entitlement selection 54 remains selected, but entitlement selection 66 has been modified, as has attribute 62. These modifications potentially necessitate a change in the user's entitlements.

Figure 5:
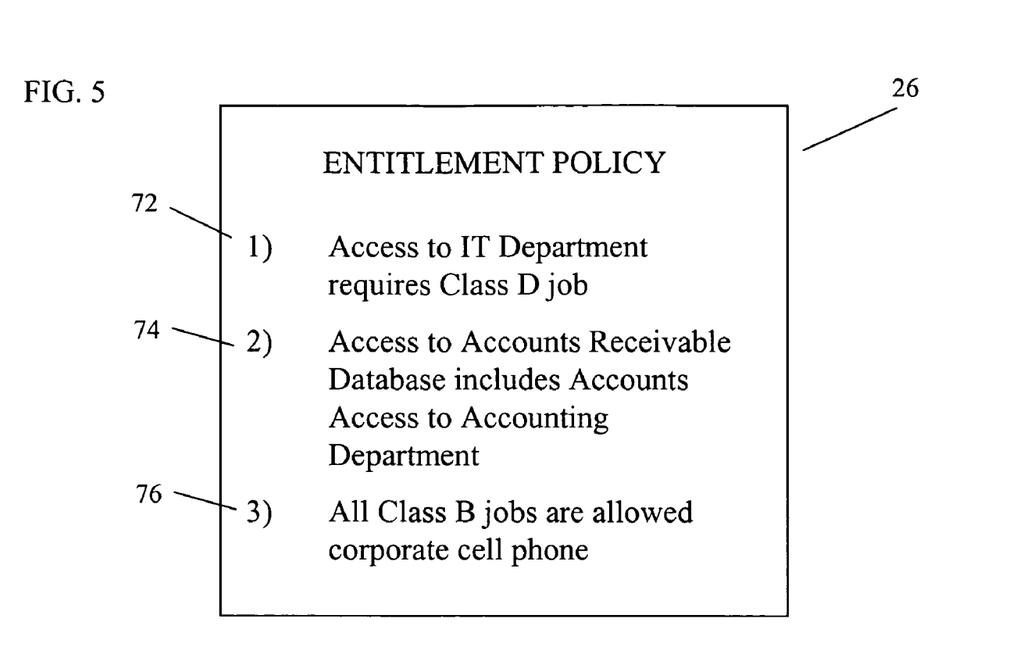
FIG. 5 is an example representation of an entitlement policy.

Referring to FIG. 5, an example entitlement policy 26 is shown. In this entitlement policy, rule 72 indicates that access to the information technology department is not allowed to be selected in a user object unless the user also has a Class D job (see entitlement selection 66 in FIG. 3). Rule 74 indicates that a user that is allowed access to the accounts receivable database is allowed to access the accounting department. Rule 76 indicates that if a user is in Job Class B, then the user is allowed a corporate cell phone. It is understood that a wide variety of rules could be implemented in entitlement policy 26.

Figure 7:
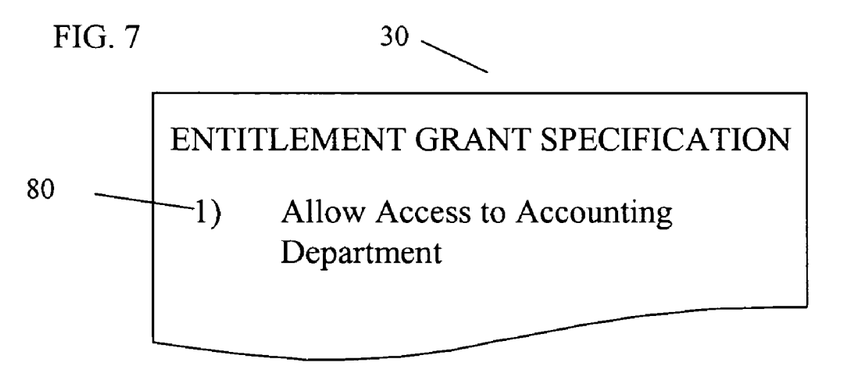
FIG. 7 is an example representation of an entitlement grant specification.
Figure 8:
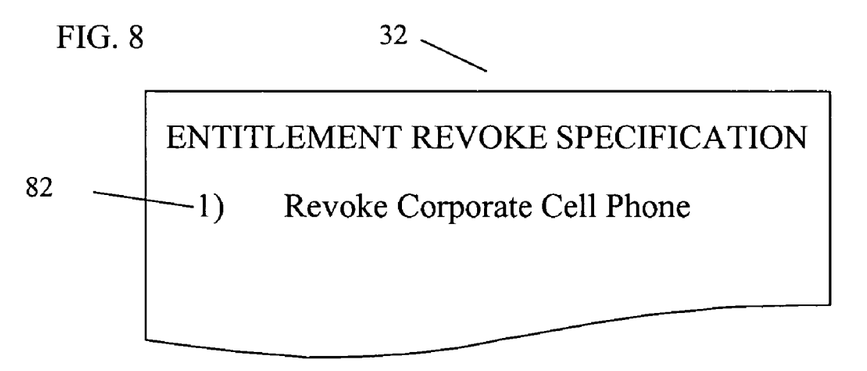
FIG. 8 is an example representation of an entitlement revoke specification.

In implementation, using FIGS. 3-5 for reference, the modification of user object 50 (thus creating user object 70) would generate a trigger. The membership list that was generated using object 50 would be duplicated, and a new membership list using user object 70 would be generated. The new membership list would be compared against the prior membership list. In addition, the change calculator could use the entitlement policy 26. In this particular example, the change calculator would force entitlement selection 58 to also be selected, because of rule 74. Further, the change calculator would revoke access to the corporate cell phone (entitlement selection 64). Even though entitlement selection 64 in user object 50 was not specifically selected, the entitlement policy 26 required that Class B Jobs had a corporate cell phone. Since entitlement selection 64 was not selected in user object 70 and because entitlement selection 66 in user object 70 was Job Class C, the change calculator will revoke access to the corporate cell phone. The change calculator will also modify the access to the accounts receivable database because of the change to attribute 62. The change calculator then creates the attribute modify specification 28 (as shown in FIG. 6), the entitlement grant specification (as shown in FIG. 7), and the entitlement revoke specification (as shown in FIG. 8).

Figure 6:
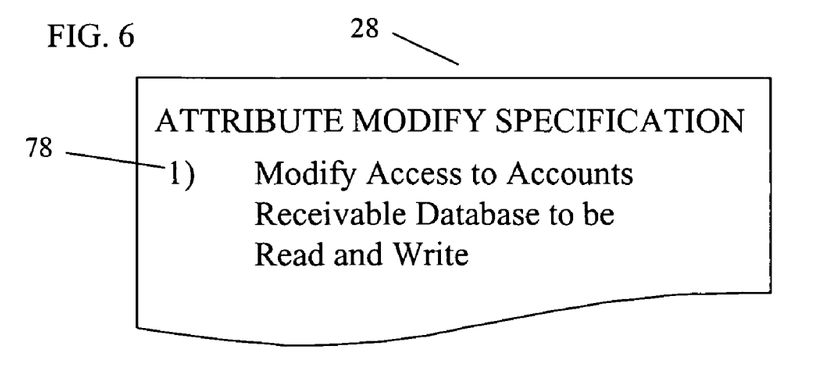
FIG. 6 is an example representation of an attribute modify specification.

Referring now to FIG. 6, an example attribute modify specification 28 is shown. As discussed, the change calculator will have detected the change of access type and would then create the specification rule 78 to modify that access. Referring now to FIG. 7, an example entitlement grant specification 30 is shown. As discussed, the change calculator will have detected the change for access to the accounting department and would then create the specification rule 80 to allow that access. Referring now to FIG. 8, an example entitlement revoked specification 32 is shown. As discussed, the change calculator will have detected the revocation of the corporate cell phone and would then create the specification rule 82 to revoke access to the cell phone.

Each of these specifications would then be accessed by the policy decision module. The policy decision module would determine that specification rule 78 (in the attribute modify specification 28) pertains to access to the accounting database and would send that rule to the policy enforcement module for the accounting database, such as the administrator software module for the database. The policy decision module would determine that specification rule 80 (in the entitlement grant specification 30) pertains to physical access for the accounting department and would send that rule to the policy enforcement module for the electronic door access system. In this example, the policy enforcement module could be software that is connected to the access card reader at the door. The policy decision module would determine that specification rule 82 (in the entitlement revoke specification 32) pertains to the cellphone, and could send an action to the human resources department to initiate physical recovery of the cellphone, as well as to the accounting software to turn off the cellphone's service.

Figure 9:
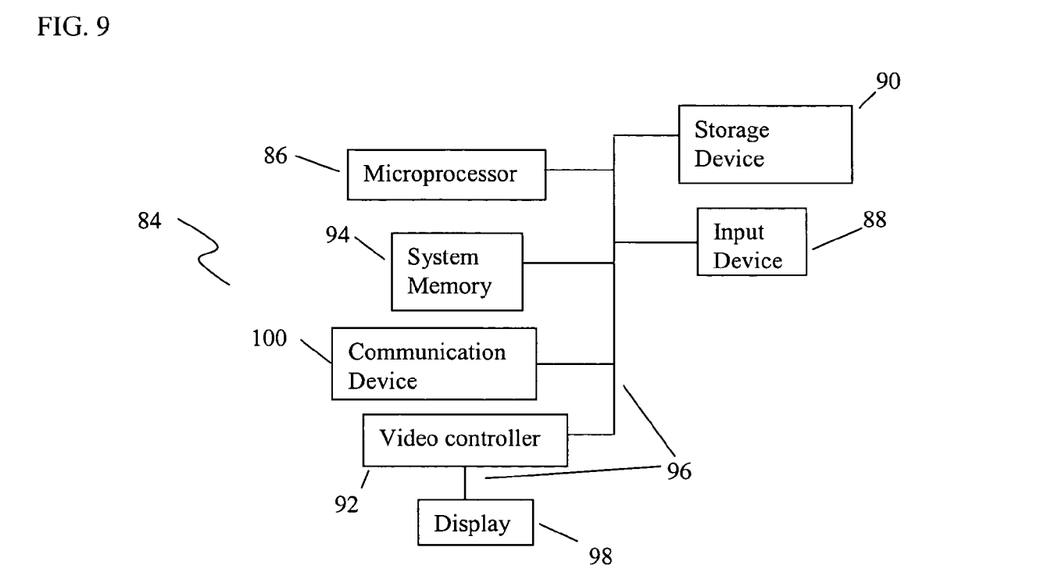
FIG. 9 is an example illustration of a node for implementing an embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 9, an illustrative node 84 for implementing an embodiment of the method is depicted. Node 84 includes a microprocessor 86, an input device 88, a storage device 90, a video controller 92, a system memory 94, and a display 98, and a communication device 100 all interconnected by one or more buses 96. The storage device 90 could be a floppy drive, hard drive, CD-ROM, optical drive, or any other form of storage device. In addition, the storage device 90 may be capable of receiving a floppy disk, CD-ROM, DVD-ROM, or any other form of computer-readable medium that may contain computer-executable instructions. Further communication device 100 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

The above disclosure provides many different embodiments, or examples, for implementing different features of the invention. Specific examples of components, and processes are described to help clarify the invention. These are, of course, merely examples and are not intended to limit the invention from that described in the claims. In one embodiment, the method may be implemented using XML, and in another embodiment, the method could be implemented using a bidirectional data sharing service, as DirXML as provided by Novell, Inc. of Provo, Utah. In a further embodiment, the invention could be implemented via web services.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for modification of access to entitlements, comprising:
    generating a first membership list from a plurality of user objects by querying an identity store comprising the plurality of user objects in accordance with a membership expression;
    receiving a trigger indicating a change in one of the plurality of user objects;
    in response to the trigger, generating a second membership list from the plurality of user objects by querying the identity store in accordance with the membership expression;
    comparing the first membership list and the second membership list to determine a difference therebetween;
    responsive to the comparing, generating a specification indicative of the difference between the first and second membership lists; and
    modifying access to an entitlement in accordance with the specification.

2. The method of claim 1, wherein the specification is an attribute modify specification.

3. The method of claim 1, wherein the specification is an entitlement revoke specification.

4. The method of claim 1, wherein the specification is an entitlement grant specification.

5. The method of claim 1, further comprising:
    transmitting the specification to a policy enforcement module.

6. The method of claim 1, further comprising:
    storing an entitlement selection corresponding to an entitlement in at least one of the user objects.

7. A computer-readable medium comprising a plurality of instructions for execution by at least one computer processor, wherein the instructions are for:
- generating a first membership list from a plurality of user objects by querying an identity store comprising the plurality of user objects in accordance with a membership expression;
- receiving a trigger indicating a change in one of the plurality of user objects of an entitlement selection corresponding to an entitlement;
- in response to the trigger, generating a second membership list from the plurality of user objects by querying the identity store in accordance with the membership expression;
- comparing the first membership list and the second membership list to determine a difference therebetween;
- responsive to the comparing:
  - generating an attribute modify specification indicative of the difference between the first and second membership lists;
  - generating an entitlement grant specification indicative of the difference between the first and second membership lists; and
  - generating an entitlement revoke specification indicative of the difference between the first and second membership lists; and
- modifying access to the entitlement in accordance with the specifications.

8. The computer-readable medium of claim 7, further comprising instructions for:
- transmitting the attribute modify specification, entitlement grant specification, and the entitlement revoke specification to a policy enforcement module.

9. The computer-readable medium of claim 7, further comprising instructions for:
- transmitting an enforcement action to a policy enforcement module.

10. The computer-readable medium of claim 7, further comprising instructions for:
- transmitting the attribute modify specification, entitlement grant specification, and the entitlement revoke specification to a policy decision module; and
- transmitting an enforcement action to a policy enforcement module.

11. A system for managing dynamic entitlements, comprising:
- a membership generator in communication with an identity store, the identity store comprising a plurality of user objects, wherein the membership generator generates a first membership list by querying the identity store in accordance with a membership expression and wherein the membership generator generates a second membership list by querying the identity store, in response to a trigger indicating a change in one of the plurality of user objects, in accordance with the membership expression;
- a change calculator that compares the first membership list and the second membership and outputs a specification containing rules in accordance with results of the comparison comprising a difference between the first membership list and the second membership list; and
- a policy enforcement module for implementing at least one rule in the specification.

12. The system of claim 11, further comprising a membership expression that stores membership list rules for use by the membership generator.

13. The system of claim 11, further comprising a policy decision module in communication with the specification and the policy enforcement module.

14. The system of claim 11 wherein each of the user objects stored in the identity store has at least one entitlement selection corresponding to an entitlement.

15. The system of claim 11, further comprising:
- an entitlement policy in communication with the change calculator.

* * * * *